United States Patent
Örtegren

(10) Patent No.: US 11,351,557 B2
(45) Date of Patent: Jun. 7, 2022

(54) HOUSING FOR A CENTRIFUGAL SEPARATOR

(71) Applicant: ALFDEX AB, Landskrona (SE)

(72) Inventor: Anders Örtegren, Häljarp (SE)

(73) Assignee: ALFDEX AB, Landskrona (SE)

( * ) Notice: Subject to any disclaimer, the term of this patent is extended or adjusted under 35 U.S.C. 154(b) by 228 days.

(21) Appl. No.: 16/349,536

(22) PCT Filed: Nov. 9, 2017

(86) PCT No.: PCT/EP2017/078787
§ 371 (c)(1),
(2) Date: May 13, 2019

(87) PCT Pub. No.: WO2018/087241
PCT Pub. Date: May 17, 2018

(65) Prior Publication Data
US 2019/0283043 A1    Sep. 19, 2019

(30) Foreign Application Priority Data
Nov. 14, 2016  (EP) .................................. 16198594

(51) Int. Cl.
*B01D 46/18*    (2006.01)
*B04B 9/12*    (2006.01)
(Continued)

(52) U.S. Cl.
CPC ................ *B04B 9/12* (2013.01); *B01D 45/14* (2013.01); *B04B 5/005* (2013.01); *B04B 5/08* (2013.01);
(Continued)

(58) Field of Classification Search
CPC .. B04B 9/12; B04B 5/005; B04B 5/08; B04B 5/12; B04B 7/02; B04B 2005/125; B01D 45/14; F01M 13/04; F01M 2013/0422
See application file for complete search history.

(56) References Cited

U.S. PATENT DOCUMENTS 2,556,317 A      6/1951  Cook
3,532,402 A  *  10/1970  Templeton ............ F16C 35/077
                                                            384/557
(Continued)

FOREIGN PATENT DOCUMENTS

CN         1055888 A      11/1991
CN       101253343 A       8/2008
(Continued)

OTHER PUBLICATIONS

International Search Report, issued in PCT/EP2017/078787, dated Dec. 6, 2017.
(Continued)

*Primary Examiner* — Dung H Bui
(74) *Attorney, Agent, or Firm* — Birch, Stewart, Kolasch & Birch, LLP

(57) ABSTRACT

A housing for a centrifugal separator is disclosed, wherein the centrifugal separator is configured to separate a liquid phase from crankcase gases of an internal combustion engine using a rotor. The housing includes a housing body forming a separation chamber, an opening in the housing body, a bearing retainer arranged at the opening, and a bearing inserted into the bearing retainer. The bearing is configured to receive a rotor shaft extending into the separation chamber. The bearing retainer includes a bearing seat portion provided with a number of plastically deformed zones retaining the bearing in the bearing retainer. A centrifugal separator and a method of retaining a bearing of a
(Continued)

rotor shaft in a housing for a centrifugal separator are also disclosed.

19 Claims, 5 Drawing Sheets

(51) Int. Cl.
*B01D 45/14* (2006.01)
*B04B 5/00* (2006.01)
*B04B 5/08* (2006.01)
*B04B 5/12* (2006.01)
*B04B 7/02* (2006.01)
*F01M 13/04* (2006.01)

(52) U.S. Cl.
CPC ............... *B04B 5/12* (2013.01); *B04B 7/02* (2013.01); *F01M 13/04* (2013.01); *B04B 2005/125* (2013.01); *F01M 2013/0422* (2013.01)

(56) References Cited

U.S. PATENT DOCUMENTS

| | | | | |
|---|---|---|---|---|
| 4,429,927 | A * | 2/1984 | Kawabata | F16C 35/04 384/585 |
| 6,338,708 | B1 * | 1/2002 | Miura | B04B 9/12 494/82 |
| 6,533,712 | B1 * | 3/2003 | Miller | B04B 1/08 494/49 |
| 7,291,192 | B1 * | 11/2007 | Lavasser | A47L 5/22 55/406 |
| 7,417,344 | B2 * | 8/2008 | Bradfield | H02K 11/046 310/90 |
| 8,657,908 | B2 | 2/2014 | Eliasson | |
| 2002/0128140 | A1 | 9/2002 | Frehland et al. | |
| 2005/0120685 | A1 | 6/2005 | Fischer et al. | |
| 2005/0187091 | A1 * | 8/2005 | South | B04B 7/08 494/49 |
| 2006/0003882 | A1 * | 1/2006 | Smith | B01D 17/10 494/49 |
| 2007/0249479 | A1 | 10/2007 | Eliasson et al. | |
| 2008/0256912 | A1 * | 10/2008 | Kup | B04B 9/06 55/385.1 |
| 2008/0279495 | A1 | 11/2008 | Schumacher et al. | |
| 2008/0296212 | A1 * | 12/2008 | Baumann | B04B 9/12 210/167.08 |
| 2009/0272680 | A1 * | 11/2009 | Wiesmann | B04B 9/12 210/167.02 |
| 2012/0174547 | A1 * | 7/2012 | Tornblom | B04B 5/005 55/461 |
| 2013/0067873 | A1 * | 3/2013 | Szepessy | F01M 13/0416 55/385.1 |
| 2013/0187499 | A1 * | 7/2013 | Watanabe | H02K 5/163 310/90 |
| 2014/0069398 | A1 * | 3/2014 | Roelver | B04B 7/02 123/572 |
| 2016/0333754 | A1 * | 11/2016 | Peck | F01M 13/04 |
| 2018/0140984 | A1 * | 5/2018 | Janssen | B01D 45/14 |
| 2020/0298252 | A1 * | 9/2020 | Erdmann | B04B 9/06 |

FOREIGN PATENT DOCUMENTS

| | | |
|---|---|---|
| CN | 101569980 A | 11/2009 |
| CN | 101803153 A | 8/2010 |
| CN | 103495511 A | 1/2014 |
| CN | 204004016 U | 12/2014 |
| CN | 104843449 A | 8/2015 |
| CN | 105619696 A | 6/2016 |
| EP | 0 215 585 A1 | 3/1987 |
| EP | 1 510 665 A2 | 3/2005 |
| JP | 04265647 A * | 9/1992 |
| JP | 2019148275 A * | 9/2019 |

OTHER PUBLICATIONS

Written Opinion of the International Searching Authority, issued in PCT/EP2017/078787, dated Dec. 6, 2017.

English translation of the Chinese Office Action and Search Report for Chinese Application No. 201780083279.6, dated Oct. 12, 2020.

* cited by examiner

HOUSING FOR A CENTRIFUGAL SEPARATOR

TECHNICAL FIELD

The present disclosure relates to a housing for a centrifugal separator, wherein the centrifugal separator is configured to separate a liquid phase from crankcase gases of an internal combustion engine, using a rotor. The present disclosure also relates to a centrifugal separator configured to separate a liquid phase from crankcase gases of an internal combustion engine using a rotor, and a method of retaining a bearing of a rotor shaft in a housing for a centrifugal separator configured to separate a liquid phase from crankcase gases of an internal combustion engine, using a rotor.

BACKGROUND

A mixture of fluids having different densities may be separated from one another through use of a centrifugal separator. One specific use of a centrifugal separator is to separate a liquid phase from crankcase gases of an internal combustion engine. Crankcase gases of an internal combustion engine derives from gas leaking past piston rings from combustion chambers of the internal combustion engine to the crankcase of the engine. This continuous leaking of gas into the crankcase can lead to an undesirable increase of pressure within the crankcase and, as a consequence, to a need to vent gas from the casing. Crankcase gases typically carries a quantity of engine oil, as droplets or a fine mist, as well as other liquid hydrocarbons, soot, and other solid combustion residues. These substances may be environmentally harmful substances. Therefore, for certain types of combustion engines, legislation requires crankcase gases to be disposed of in an environmentally friendly manner.

In some internal combustion engines, the crankcase gases are led to an inlet of the combustion engine. In this way, the crank case gases will not directly be vented out to the surrounding air. However, functionality of the internal combustion engine may be adversely affected by the presence of oil in the inlet air, particularly for engines comprising turbocharging system wherein the efficiency of a compressor of the turbocharging system can be adversely affected by the presence of oil. Therefore, it is an advantage if the crankcase gas is cleaned to remove oil carried by the gas prior to the gas being introduced into the inlet system. This cleaning process may be undertaken by a centrifugal separator, which is mounted on or adjacent the crankcase and which directs cleaned gas to the inlet system and directs separated oil back to the crankcase. An example of such a separator is disclosed e.g. in U.S. Pat. No. 8,657,908.

An internal combustion engine generates a lot of vibrations and noise during start-up, during running, as well as during shut-down. This is due to the high pressures in the combustion chambers as well as due to movement of pistons, connecting rods and other components of the engine. Therefore, a centrifugal separator mounted on or adjacent the crankcase of an internal combustion engine will be subjected to a considerable amount of vibrations during start-up, during running, as well as during shut-down of the engine.

When producing components for a centrifugal separator configured to separate a liquid phase from crankcase gases of an internal combustion engine, it is an advantage if it is ensured that the components are durable enough to last the lifetime of the engine.

Further, in order to provide a competitive product, it is an advantage if the components of the centrifugal separator can be obtained in a cost efficient manner.

SUMMARY

It is an object of the present invention to provide a robust housing for a centrifugal separator which can be produced in a cost efficient manner.

According to an aspect of the invention, the object is achieved by a housing for a centrifugal separator, wherein the centrifugal separator is configured to separate a liquid phase from crankcase gases of an internal combustion engine using a rotor, wherein the housing comprises a housing body forming a separation chamber, an opening in the housing body, a bearing retainer arranged at the opening, and a bearing inserted into the bearing retainer. The bearing is configured to receive a rotor shaft extending through the bearing and the opening into the separation chamber. The rotor shaft is configured to hold the rotor within the separation chamber. The bearing retainer comprises a bearing seat portion provided with a number of plastically deformed zones retaining the bearing in the bearing retainer. Since the bearing seat portion is provided with a number of plastically deformed zones retaining the bearing in the bearing retainer, the bearing is retained in the bearing retainer in a secure manner being less vulnerable to vibrations than for example when using a bearing retainer comprising fastening elements, such as screws or bolts for retaining a bearing.

Further, a less complex housing for a centrifugal separator is provided since the need for fastening elements such as screws or bolts for retaining a bearing is circumvented.

Even further, a housing for a centrifugal separator is provided which can be produced in a cost efficient manner since the retaining of the bearing in the bearing retainer requires no attachment of fastening elements, such as screws or bolts, thereby saving time in the manufacturing process of the housing.

In addition, a housing for a centrifugal separator is provided in which the bearing is retained using a low number of manufacturing tolerances, also referred to as engineering tolerances, for the alignment between the bearing and the rotor shaft of the centrifugal separator, as compared to a prior art solution where the bearing is retained using further fastening elements such as e.g. screws or bolts, which in turn require further manufacturing tolerances, adding to manufacturing costs. As a result, the bearing can easily and accurately be aligned with the rotor shaft of the centrifugal separator which may further improve durability of the bearing, as well as of the bearing retainer of the housing.

Thus, a robust and durable housing for a centrifugal separator is provided which can be produced in a cost efficient manner. As a result, the above mentioned object is achieved.

Optionally, the bearing comprises an outer ring configured to be stationary relative the housing during rotation of the rotor shaft, wherein the number of plastically deformed zones abut against the outer ring of the bearing. As a result, the bearing is securely retained in the bearing retainer without the need for any fastening elements such as screw or bolts. Still, an inner ring of the bearing may freely rotate upon rotation of the rotor shaft.

Optionally, the bearing retainer is provided with walls enclosing an outer surface of the bearing, wherein the bearing seat portion further comprises a stop portion extending into bearing seat portion, wherein the outer ring comprises a first surface abutting the stop portion of the bearing seat portion, and a second surface, being opposite to the first surface, wherein the number of plastically deformed zones abut against the second surface of the outer ring of the bearing. Thereby, the bearing is retained in the bearing retainer in an even more secure manner being even less vulnerable to vibrations.

Optionally, the number of plastically deformed zones abut against the second surface in at least three locations. Plastically deformed zones abutting against the second surface in at least three locations have proven to achieve a sufficient and a secure retaining of the bearing in the bearing retainer. Thereby, a secure retaining of the bearing in the bearing retainer can be achieved in a simple manner, for example by using a punch tool.

Optionally, the number of plastically deformed zones enclose the second surface of the bearing. Thereby, the bearing is retained in the bearing retainer in an even more secure manner being even less vulnerable to vibrations. In addition, the second surface of the bearing is protected by the number of plastically deformed zones.

Optionally, the outer ring of the bearing is provided with a circular edge between the second surface and the outer surface, wherein the number of plastically deformed zones abut against the circular edge. By abutting against the circular edge of the bearing, a secure retaining of the bearing is provided. Further, the abutting against the circular edge of the bearing may further contribute to keep the bearing aligned with the rotor shaft of the centrifugal separator.

Optionally, the bearing further comprises an inner ring and rotatable bodies arranged between the inner ring and the outer ring. Thereby, a robust and durable bearing is provided.

Optionally, the number of plastically deformed zones cover an area between the inner ring and the outer ring of the bearing. Thereby, the area between the inner ring and the outer ring is protected by the number of plastically deformed zones. As a result, the risk of any dirt, or other unwanted substances, entering the area between the inner ring and the outer ring is reduced. Thus, the lifespan of the bearing may be improved.

Optionally, the bearing further comprises a sealing washer covering an area between the inner ring and the outer ring, and wherein the number of plastically deformed zones abut against the sealing washer. The sealing washer may be made of a metallic, and/or plastic material, and is arranged to seal the area between the inner ring and the outer ring of the bearing. Thereby, the area between the inner ring and the outer ring is even further protected. The abutting of the number of plastically deformed zones against the sealing washer may contribute to keep the sealing washer in place. As a result, the risk of any dirt, or other unwanted substances, entering the area between the inner ring and the outer ring is even further reduced. Thus, the lifespan of the bearing may be further improved.

Optionally, the number of plastically deformed zones enclose the sealing washer. Thereby, the sealing washer is protected by the number of plastically deformed zones, which may further improve durability of the sealing washer and thus also the bearing.

Optionally, the number of plastically deformed zones are formed by roll forming. Thereby, the bearing is securely retained in the bearing retainer in a simple, secure and effective manner.

Optionally, the housing body and the bearing retainer are made of a metallic material, preferably an aluminium material. Thereby, the housing body and the bearing retainer may be provided in a single piece of a light weight material being durable. Providing the housing body and the bearing retainer in one piece further reduces the number of manufacturing tolerances for the alignment between the bearing and the rotor shaft of the centrifugal separator. Further, it improves robustness and durability of the housing.

Optionally, the housing body is made of a polymeric material, and wherein the bearing retainer is made of a metallic material, preferably an aluminium material. A polymeric material is light weight, cheap, resistant to vibrations and resistant to formation of cracks. A metallic material, such as an aluminium material is harder than a polymeric material. Therefore, by providing the housing body in a polymeric material, and the bearing retainer in a metallic material, such as an aluminium material, a light weight, cheap and robust hosing is provided in which the bearing is securely retained.

Optionally, at least portions of the bearing retainer are embedded in the housing body. The feature that at least portions of the bearing retainer are embedded in the housing body may encompass that the at least portions of the bearing retainer extends into the material of the housing body such that the material of the housing body encloses the at least portions of the bearing retainer. Since at least portions of the bearing retainer are embedded in the housing body, an easy and reliable attachment of the bearing retainer to the housing body is achieved using a low number of manufacturing tolerances for the alignment between the bearing and the rotor shaft of the centrifugal separator.

A further object of the present invention to provide a robust centrifugal separator configured to separate a liquid phase from crankcase gases of an internal combustion engine using a rotor, which centrifugal separator can be produced in a cost efficient manner.

According to an aspect of the invention, the further object is achieved by a centrifugal separator configured to separate a liquid phase from crankcase gases of an internal combustion engine using a rotor, wherein the centrifugal separator comprises a housing according to some embodiments. Since the centrifugal separator comprises a housing according to some embodiments, a robust, durable and less complex centrifugal separator is provided which can be produced in a cost efficient manner. As a result, the above mentioned further object is achieved.

Optionally, the centrifugal separator further comprises a bearing plate provided with a further opening and a further bearing retainer arranged at the further opening, and a further bearing inserted into the further bearing retainer, wherein the further bearing is configured to receive the rotor shaft extending through the further bearing and the further opening into the separation chamber, wherein the further bearing retainer comprises a bearing seat portion provided with a number of plastically deformed zones retaining the further bearing in the further bearing retainer. Thereby, a centrifugal separator is provided in which the further bearing is retained in a secure manner being less vulnerable to vibrations. Further, an even less complex centrifugal separator is provided since the need for fastening elements such as screws or bolts for retaining a bearing is circumvented also for the further bearing. In addition, also the further bearing is retained using a low number of manufacturing tolerances which improves durability and robustness of the housing and thus also of the centrifugal separator comprising the housing.

Even further, a centrifugal separator is provided which can be produced in an even more cost efficient manner since also the further bearing can be retained without using fastening elements, such as screws or bolts, which saves time in the manufacturing process of the centrifugal separator. The bearing plate provided with the further bearing retainer retaining the further bearing may be positioned below the rotor and thus also below separation members, and/or separation discs, of the rotor. Accordingly, the further bearing may constitute a lower bearing positioned below the rotor and the separation members, and/or separation discs, of the rotor and the bearing in the bearing retainer may constitute an upper bearing positioned above the rotor, and the separation members and/or separation discs, of the rotor.

An even further object of the present invention to provide a method of retaining a bearing of a rotor shaft in a housing for a centrifugal separator which provides a robust housing in a cost efficient manner.

According to an aspect of the invention, the even further object is achieved by a method of retaining a bearing of a rotor shaft in a housing for a centrifugal separator, wherein the centrifugal separator is configured to separate a liquid phase from crankcase gases of an internal combustion engine using a rotor, wherein the housing comprises a housing body forming a separation chamber, an opening in the housing body, a bearing retainer arranged at the opening, and a bearing configured to receive a rotor shaft extending through the bearing and the opening into the separation chamber, the rotor shaft being configured to hold the rotor within the separation chamber, wherein the bearing retainer comprises a bearing seat portion for insertion of the bearing, wherein the bearing seat portion is provided with walls configured to enclose the bearing, and wherein the bearing seat portion comprises at least one protrusion arranged at the walls of the bearing seat portion protruding therefrom, wherein the method comprises:

inserting the bearing into the bearing seat portion of the bearing retainer, and
  performing a plastic deformation of the at least one protrusion towards the bearing so as to form a number of plastically deformed zones to retain the bearing in the bearing retainer.

Since the method comprises performing a plastic deformation of the at least one protrusion towards the bearing so as to form a number of plastically deformed zones to retain the bearing in the bearing retainer, the bearing is retained bearing retainer in a secure manner being less vulnerable to vibrations than for example when using a bearing retainer comprising fastening elements, such as screws or bolts, for retaining a bearing.

Further, a less complex method of retaining a bearing of a rotor shaft in a housing for a centrifugal separator is provided since the need for fastening elements, such as screws or bolts, for retaining a bearing is circumvented.

Even further, a cost efficient method is provided since the retaining of the bearing in the bearing retainer requires no attachment of fastening elements, such as screws or bolts, thereby saving time.

In addition, a method is provided resulting in a low number of manufacturing tolerances for the alignment between the bearing and the rotor shaft of the centrifugal separator. As a result, the bearing can easy and accurately be aligned with the rotor shaft of the centrifugal separator which may further improve durability of the bearing, as well as durability of the bearing retainer of the housing.

Thus, a method of retaining a bearing of a rotor shaft in a housing for a centrifugal separator is provided which provides a robust housing in a cost efficient manner. As a result, the above mentioned even further object is achieved.

Plastic deformation is a process where forces are applied onto an object to deform the object or a portion of the object, and due to the size, geometry and material of the object, as well as the magnitude of forces applied, the object does not return to its original shape once the forces are no longer applied. Plastic deformation may also be referred to as a permanent deformation.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1:
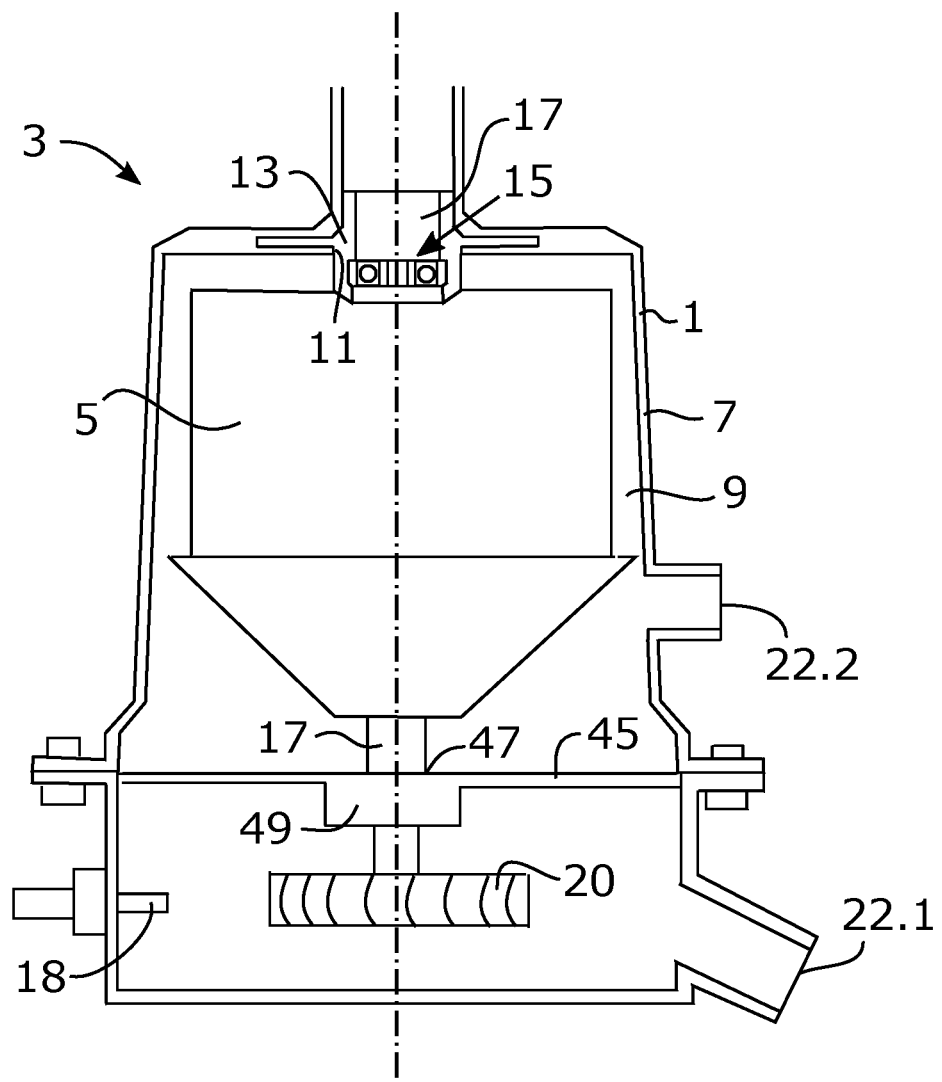
FIG. 1 illustrates a centrifugal separator configured to separate a liquid phase from crankcase gases of an internal combustion engine using a rotor.

FIG. 1 illustrates a centrifugal separator 3 configured to separate a liquid phase from crankcase gases of an internal combustion engine using a rotor 5. The centrifugal separator 3 comprises a housing 1 comprising a housing body 7 forming a separation chamber 9, an opening 11 in the housing body 7, a bearing retainer 13 arranged at the opening 11, and a bearing 15 inserted into the bearing retainer 13. The housing 1 is a stationary housing 1 which means that it is arranged to be stationary relative the internal combustion engine during operation. The bearing 15 is configured to receive a rotor shaft 17 extending through the bearing 15 and the opening 11 into the separation chamber 9. The rotor shaft 17 is configured to hold the rotor 5 within the separation chamber 9.

The centrifugal separator 3 illustrated in FIG. 1 comprises an oil nozzle 18 connected to an engine oil circuit of the internal combustion engine. During running of the internal combustion engine, oil is pumped through the oil nozzle 18 onto a wheel 20 connected to the rotor shaft 17 to thereby rotate the rotor shaft 17 and the rotor 5. As an alternative, the centrifugal separator 3 may comprise an electric motor arranged to rotate the rotor shaft 17 and the rotor 5. As a further alternative, the centrifugal separator 3 may comprise a turbine wheel connected to the rotor shaft 17, where the turbine wheel is arranged to be driven by exhaust gases from the internal combustion engine to rotate the rotor shaft 17 and the rotor 5. The centrifugal separator 3 illustrated in FIG. 1 comprises an inlet for the crankcase gas through the rotor shaft 17. However, the centrifugal separator 3 may comprise a separate inlet for the crankcase gas in an upper region of the housing 1. From the inlet, the crankcase gas is ducted into the rotor. The rotor comprises separation members and/or separation discs such as a stack of frustoconical separation discs. For clarity reasons, such separation members and/or separation discs are not illustrated in FIG. 1. During rotation of the rotor 5, oil, as well as other particles and/or substances, from the crankcase gas is separated from the gas. The separated oil, and other particles and/or substances, is led to an oil outlet 22.1 of the centrifugal separator 3, which together with oil from the oil nozzle 18 used to drive the wheel 20, is led back to the engine oil circuit of the internal combustion engine. The centrifugal separator 3 further comprises a cleaned crankcase gas outlet 22.2, where cleaned crankcase gas is led to an inlet of the internal combustion engine, or is led out into the surrounding air.

Figure 2:
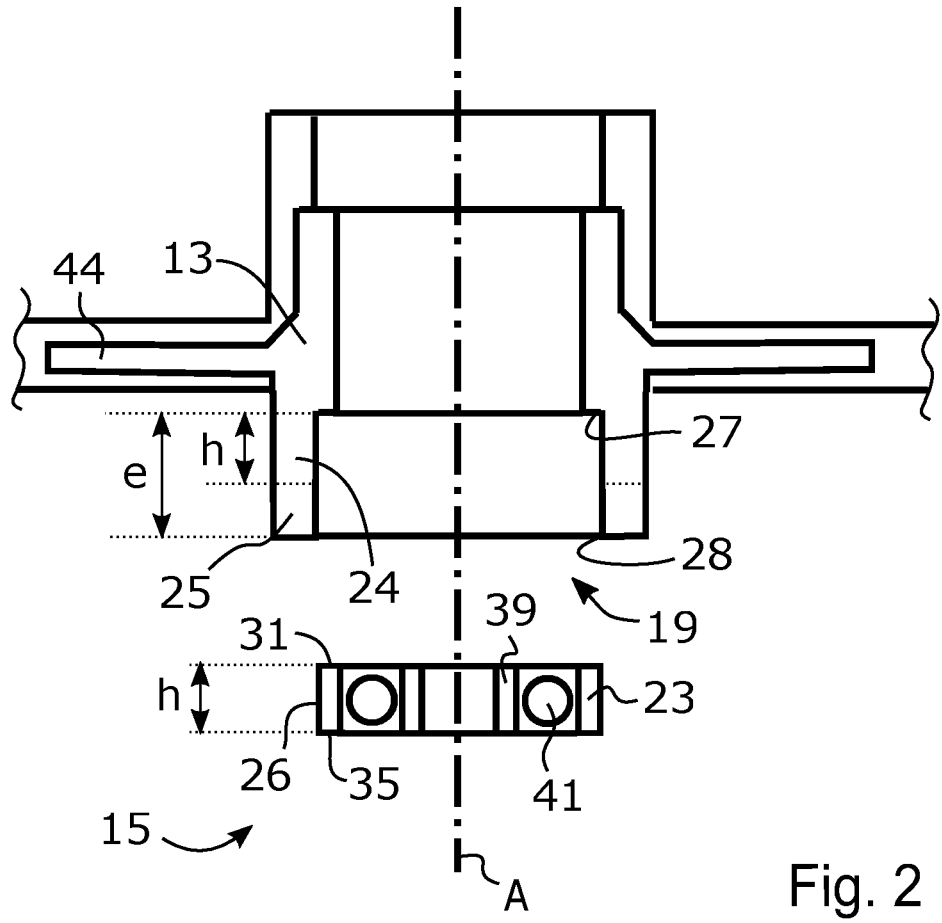
FIG. 2 illustrates a bearing retainer.

FIG. 2 illustrates a bearing retainer 13 according to some embodiments. The bearing retainer 13 comprises a bearing seat portion 19 for insertion of the bearing 15. The bearing seat portion 19 is provided with walls 24 configured to enclose the bearing 15 when the bearing 15 is inserted into the bearing seat portion 19. The bearing seat portion 19 comprises at least one protrusion 25 arranged at the walls 24 of the bearing seat portion 19 protruding therefrom, and wherein the at least one protrusion 25 is arranged to be subjected to plastic deformation towards the bearing 15 so as to form a number of plastically deformed zones 21, retaining the bearing 15 in the bearing retainer 13.

Plastic deformation is a process where forces are applied onto an object to deform at least a portion of the object, and due to the size, geometry and material of the object, as well as the magnitude of forces applied, the object, or the portion of the object, does not return to its original shape once the forces are no longer applied. In order to plastically deform, the yield strength, or yield stress, of a material has to be exceeded. For instance, many metallic materials, such as e.g. aluminium, steel, and brass, have clearly distinguishable yield strengths. When subjected to plastic deformation, the material from which the object is made is subjected to permanent changes in its microstructure, such as e.g. by the formation of dislocations. Thus, it is possible to establish whether or not a material has been plastically deformed. Plastic deformation may be referred to as a permanent deformation as opposed to elastic deformation where, due to the size, geometry and material of the object, as well as the magnitude of forces applied, the object returns to its original shape once the forces are no longer applied.

Accordingly, each of the plastically deformed zones 21 of the bearing retainer 13 is distinguishable from non-deformed zones of the bearing retainer 13. Therefore, the number of plastically deformable zone 21 form structural features of the bearing retainer 13, the housing 1, and the centrifugal separator 3. The plastically deformed zones 21 are portions of the material, from which the bearing retainer 13 is made, in which portions the yield stress of the material has been exceeded.

According to the embodiments of the bearing retainer 13 illustrated in FIG. 2, the walls 24 of the bearing seat portion 19 is essentially cylinder shaped and is provided with a height h in a direction of a cylinder axis A of the essentially cylinder shaped walls 24. The height h of the walls 24 is equal to a height h of the bearing 15 to be retained. The walls 24 and the at least one protrusion 25 together have an extension e, in the direction of the cylinder axis A of the essentially cylinder shaped walls 24, exceeding the height h of the bearing 15 to be retained. The protrusion 25 arranged at the walls 24 of the bearing seat portion 19 also comprises cylinder shaped walls which, as illustrated, may constitute a continuation of the walls 24 of the bearing seat portion 19 configured to enclose the bearing 15. Accordingly, according to some embodiments, the walls 24 of the bearing seat portion 19 and the at least one protrusion 25 may be embodied by a coherent cylinder having an extension e in a direction of a cylinder axis A of the bearing seat portion 19 exceeding a height h of the bearing 15 to be retained. According to further embodiments, the bearing retainer 13 comprises a plurality of interspaced protrusions 25 circumferentially arranged at the walls 24 of the bearing seat portion 19. Purely as an example, according to such embodiments, the bearing retainer 13 may comprise 2-8 interspaced protrusions 25 circumferentially arranged at the walls 24 of the bearing seat portion 19.

Figure 3:
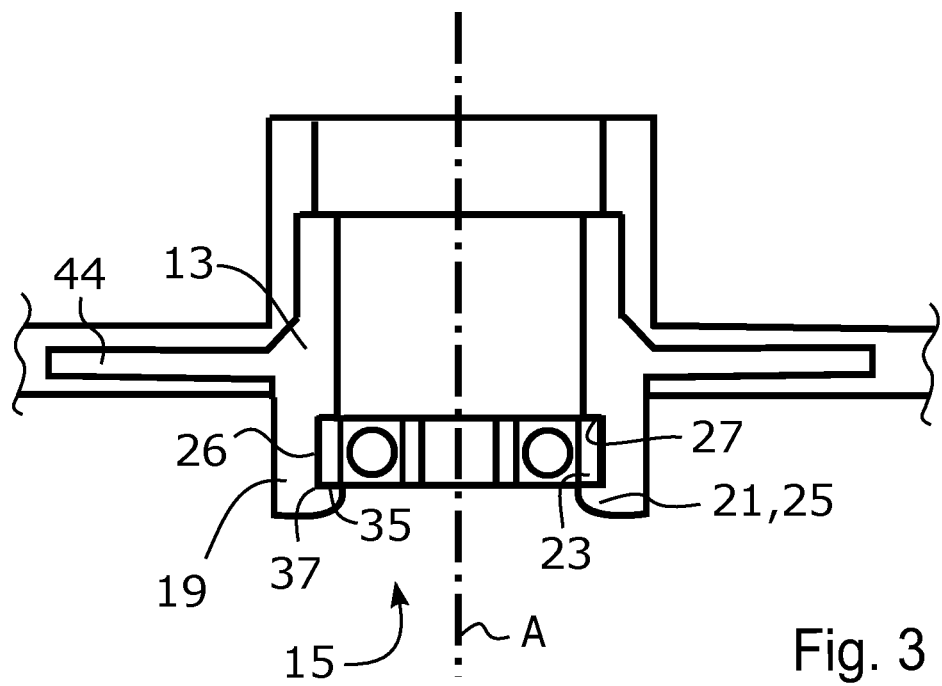
FIG. 3 illustrates the bearing retainer illustrated in FIG. 2, where a bearing is retained in the bearing retainer.
Figure 8A:
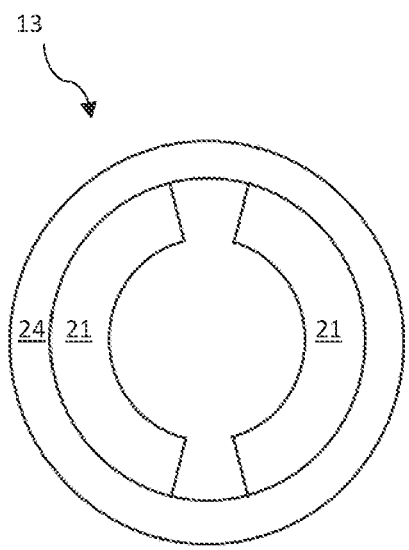
FIGS. 8a and 8b are bottom views of a bearing retainer, wherein a number of plastically deformed zones extend radially inwardly.
Figure 8B:
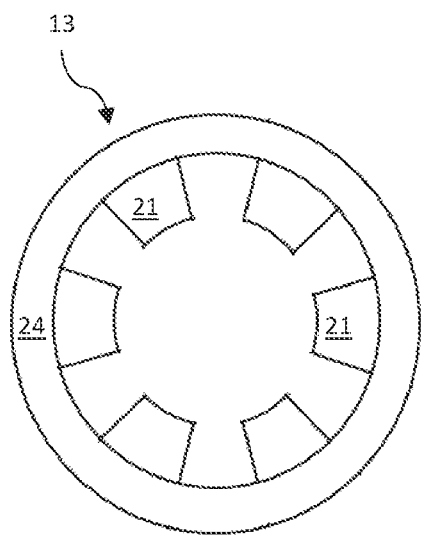

FIG. 3 illustrates the bearing retainer 13 illustrated in FIG. 2 where the bearing 15 has been inserted into the bearing seat portion 19 of the bearing retainer 13. Further, a plastic deformation has been performed of the at least one protrusion 25 towards the bearing 15 so as to form a number of plastically deformed zones 21 to retain the bearing 15 in the bearing retainer 13. Thus, as is illustrated in FIG. 3, the bearing retainer 13 comprises a bearing seat portion 19 provided with a number of plastically deformed zones 21 retaining the bearing 15 in the bearing retainer 13. Thus, when plastically deformed, the at least one protrusion 25 forms the number of plastically deformed zones 21. At least portions of the number of plastically deformed zones 21 may extend in a radial direction of the cylinder axis A of the bearing seat portion 19, to retain the bearing 15 in the bearing retainer 13. In the embodiments illustrated, prior to the plastic deformation, the at least one protrusion 25 extends in an axial direction of the cylinder axis A, as is illustrated in FIG. 2, and after the plastic deformation, the at least one protrusion 25, now forming the number of plastically deformed zones 21, extends in the radial direction of the cylinder axis A. Thereby, the bearing 15 is securely retained in the bearing retainer 13. Purely as an example, the bearing retainer may comprise 1-8 plastically deformed zones 21 retaining the bearing 15 in the bearing retainer 13. FIG. 8a is a bottom view of the bearing retainer having two plastically deformed zones 21 and FIG. 8b is a bottom view of the bearing retainer having six plastically deformed zones 21. The number of plastically deformed zones 21 may from discrete zones of the bearing retainer 13, arranged at regular or irregular intervals around the bearing 15, i.e. each of the plastically deformed zones 21 may be isolated from each other, e.g. by circumferential interspaces in between each of the plastically deformed zones 21, or by zones which are not plastically deformed in between the plastically deformed zones 21. Alternatively, the number of plastically deformed zones 21 may form one continuous region of plastically deformed material, i.e. the plastically deformed zones 21 reaching into each other, e.g. forming a belt of plastically deformed material in the bearing retainer 13 adjacent to the bearing 15. The number of plastically deformed zones 21 may be formed using a forming process, such as roll forming or punch forming.

The bearing 15 comprises an outer ring 23 configured to be stationary relative the housing during rotation of the rotor shaft. The number of plastically deformed zones 21 abut against the outer ring 23 of the bearing 15.

As best seen in FIG. 2, the bearing retainer 13 is provided with walls 24 configured to enclose an outer surface 26 the bearing 15. The bearing seat portion 19 further comprises a stop portion 27 extending into bearing seat portion 19 in a radial direction of the cylinder axis A of the bearing seat portion 19. Thereby, the stop portion 27 stops further displacement of the bearing 15 in an insert direction when the bearing 15 is fully inserted into the bearing seat portion 19. The bearing 15 comprises an inner ring 39 and rotatable bodies 41 arranged between the inner ring 39 and the outer ring 23. The outer ring 23 comprises a first surface 31 and a second surface 35, being opposite to the first surface 31. When the bearing 15 is inserted into the bearing seat portion 19, the first surface 31 of the outer ring 23 abuts the stop portion 27 of the bearing seat portion 19. Further, as seen in FIG. 3, the number of plastically deformed zones 21 abut against the second surface 35 of the outer ring 23 of the bearing 15. As a result, the bearing 15 is securely retained in the bearing retainer 13 without the need for any fastening elements such as screw or bolts. Still, the inner ring 39 of the bearing 15 may freely rotate upon rotation of the rotor shaft.

The number of plastically deformed zones 21 may abut against the second surface 35 in at least three locations. Further, the outer ring 23 of the bearing 15 is provided with a circular edge 37 between the second surface 35 and the outer surface 26, wherein the number of plastically deformed zones 21 abut against the circular edge 37. According to some embodiments, the plastically deformed zones 21 are arranged so as to enclose at least 25%, such as at least 50%, or at least 75% of the circular edge 37 between the second surface 35 and the outer surface 26 of the bearing 15. Thereby, a secure retaining of the bearing 15 is provided and the enclosing of the circular edge 37 of the bearing 15 may further contribute to keep the bearing 15 aligned with the rotor shaft of the centrifugal separator.

According to the embodiments illustrated in FIG. 3, the number of plastically deformed zones 21 enclose the second surface 35 of the bearing 15. According to further embodiments, the plastically deformed zones 21 are arranged so as to enclose at least 25%, such as at least 50%, or at least 75% of the second surface 35 of the bearing 15. Thereby, the bearing 15 is securely retained in the bearing retainer 13.

Figure 4:
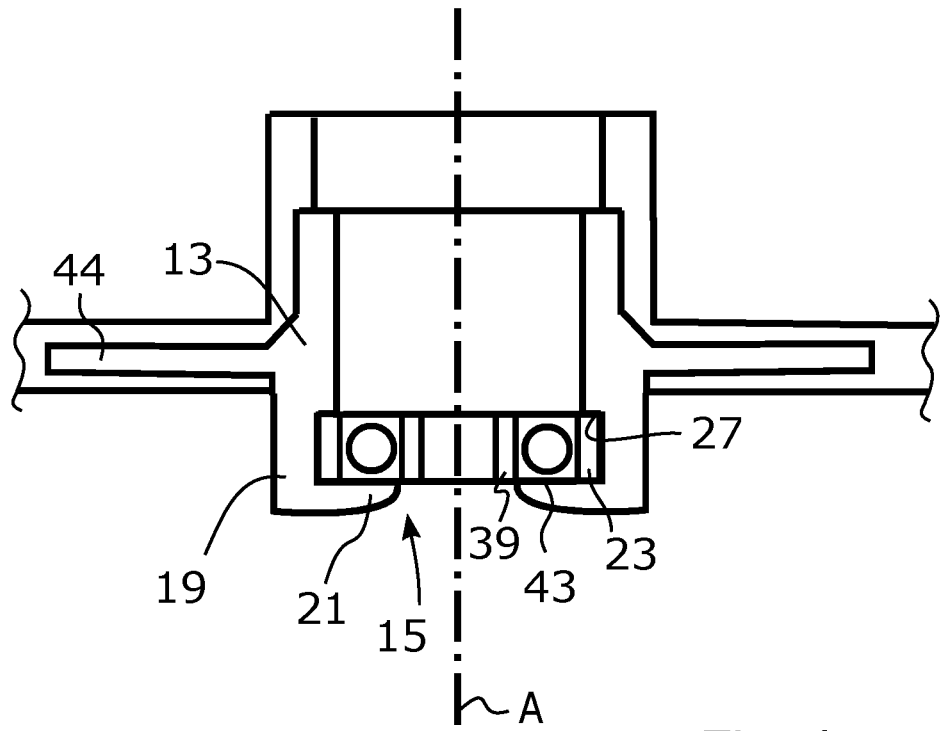
FIG. 4 illustrates a bearing retainer, wherein a number of plastically deformed zones cover an area between an inner ring and an outer ring of the bearing.

FIG. 4 illustrates a bearing retainer 13, wherein the number of plastically deformed zones 21 cover an area 43 between the inner ring 39 and the outer ring 23 of the bearing 15. Thereby, the area 43 between the inner ring 39 and the outer ring 23 is protected from the environment within the separation chamber by the number of plastically deformed zones 21, which may further improve the lifespan of the bearing 15.

Figure 5:
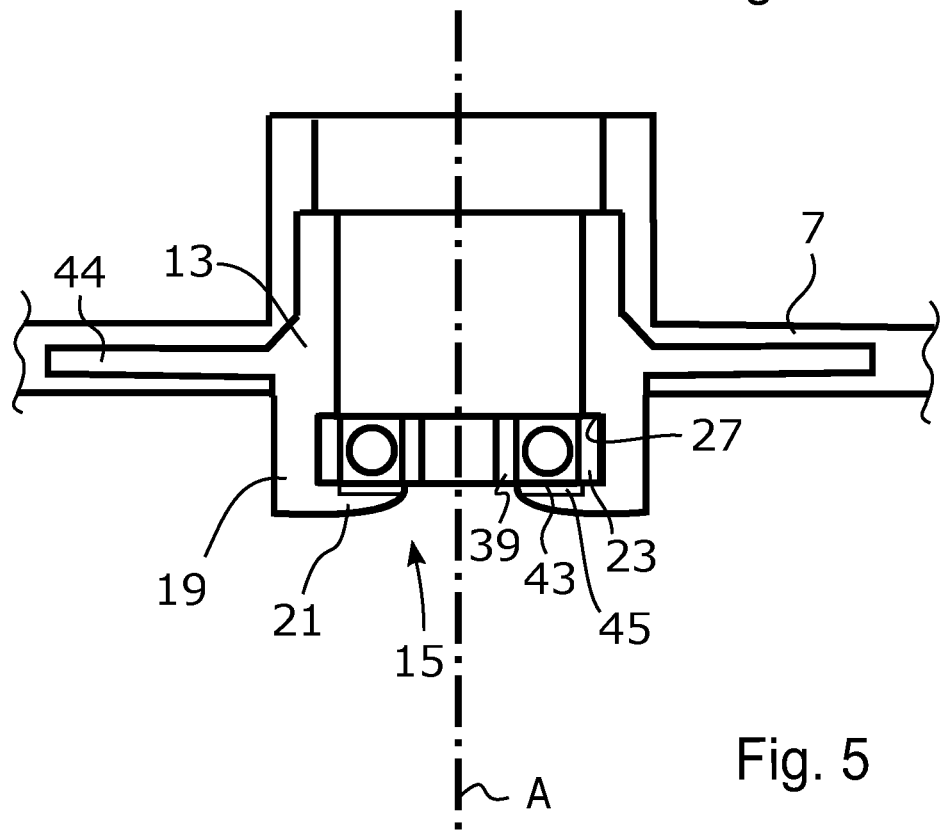
FIG. 5 illustrates a bearing retainer, wherein the bearing further comprises a sealing washer covering an area between the inner ring and the outer ring of the bearing.

FIG. 5 illustrates a bearing retainer 13, wherein the bearing 15 further comprises a sealing washer 45 covering the area 43 between the inner ring 39 and the outer ring 23, and wherein the number of plastically deformed zones 21 abut against the sealing washer 45. The sealing washer 45 may be made of a metallic and/or plastic material and is arranged to seal the area 43 between the inner ring 39 and the outer ring 23. Thereby, the area 43 between the inner ring 39 and the outer ring 23 is even further protected from the environment within the separation chamber. In addition, the abutting of the number of plastically deformed zones 21 against the sealing washer 45 may contribute to keep the sealing washer 45 in place. Further, in the embodiments illustrated, the number of plastically deformed zones 21 enclose the sealing washer 45. Thereby, also the sealing washer 45 is protected from the environment within the separation chamber, by the number of plastically deformed zones 21, which may further improve the lifespan of the sealing washer 45 and thus also the bearing 15.

With reference to FIG. 1, the housing body 7 and the bearing retainer 13 may be made of a metallic material, preferably an aluminium material. In further embodiments, the housing body 7 is made of a polymeric material, and wherein the bearing retainer 13 is made of a metallic material, preferably an aluminium material. In all these embodiments, the bearing retainer 13 may be an integral part of the housing body 7, free of any other bearing retaining means, such as screws or bolts, for retaining the bearing 15 in the bearing retainer 13. Thereby, the bearing 15 is retained in the bearing retainer 13 in a secure manner being less complex and less vulnerable to vibrations than when using a bearing retainer 13 comprising fastening elements, such as screws or bolts, for retaining a bearing 15. In addition, a housing 1 for a centrifugal separator 3 is provided in which the bearing 15 is retained using a low number of tolerances for the alignment between the bearing 15 and the rotor shaft 17 of the centrifugal separator 3, as compared to a prior art solution where the bearing 15 is retained using fastening elements such as screws or bolts.

According to further embodiments, the bearing retainer 13 is a separate part from the housing body. In these embodiments, the insertion of the bearing 15 into the bearing seat portion 19 of the bearing retainer 13, and the plastic deformation of the at least one protrusion 25 towards the bearing 15 to retain the bearing 15 in the bearing retainer 13, may be performed prior to mounting the bearing retainer 13 to the housing body 7. In such embodiments, the bearing retainer 13 and the housing body 7 may comprise mounting elements, or mounting portions, such as holes, for mounting the bearing retainer 13 to the housing body 7, for example by using screws, or nut and bolts.

As an alternative, or in addition, at least portions 44 of the bearing retainer 13 may be embedded in the housing body 7, as is illustrated in FIG. 1-6. According to the embodiments of these figures, the at least portions 44 of the bearing retainer 13 extends into the material of the housing body 7, in a region of the opening 11 in the housing body 7, such that the material of the housing body 7 encloses the at least portions 44 of the bearing retainer 13.

The bearing retainer 13 may be attached to the housing body 7 during a moulding process of the housing body 7 such that material of the housing body encloses the at least portions 44 of the bearing retainer 13. Thereby, the bearing retainer 13 may be made an integral part of the housing body 7 in a simple and secure manner.

As is illustrated in FIG. 1, the centrifugal separator 3 further comprises a bearing plate 46 provided with a further opening 47 and a further bearing retainer 49 arranged at the further opening 47. A further bearing is inserted into the further bearing retainer 49 and the further bearing is configured to receive the rotor shaft 17 extending through the further bearing and the further opening 47 into the separation chamber 9. Thus, in the embodiments illustrated in FIG. 1, the bearing 15 in the bearing retainer 13 constitutes an upper bearing positioned above the rotor 5 and thus also above separation members and/or separation discs of the rotor 5, and the further bearing in the further bearing retainer 49 constitutes a lower bearing positioned below the rotor 5 and thus also below the separation members and/or separation discs of the rotor 5.

Figure 6:
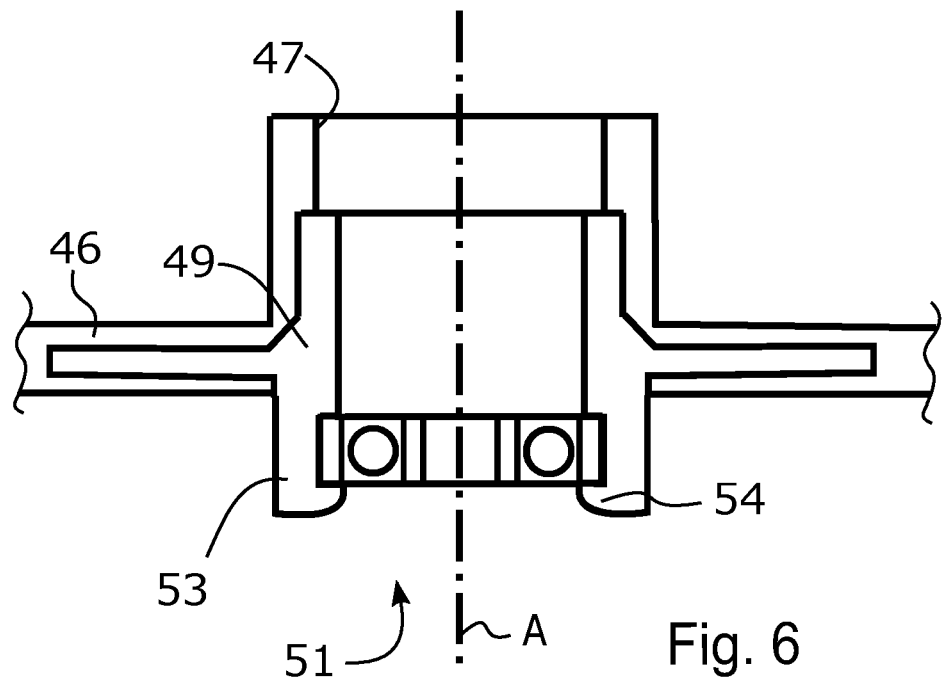
FIG. 6 illustrates a further bearing retainer arranged at a further opening of a bearing plate of the centrifugal separator.

FIG. 6 illustrates the further bearing retainer 49 arranged at the further opening 47 of the bearing plate 46. The further bearing 51 is inserted into the further bearing retainer 49. The further bearing retainer 49 comprises a bearing seat portion 53 provided with a number of plastically deformed zones 54 retaining the further bearing 51 in the further bearing retainer 49. The further bearing retainer 49 may comprise the corresponding features as described above for the bearing retainer 13. For example, the number of plastically deformed zones 54 may be formed using a forming process such as roll forming or punch forming. The number of plastically deformed zones 54 may abut against a second surface of the further bearing 51 in at least three locations, may abut against a circular edge between the second surface and an outer surface of the further bearing 51. Further, the number of plastically deformed zones 54 may enclose the second surface of the further bearing 51. The number of plastically deformed zones 54 may cover an area between an inner ring and an outer ring of the further bearing 51. The further bearing 51 may comprise a sealing washer covering the area between the inner ring and the outer ring, where the number of plastically deformed zones 54 may abut against the sealing washer, and/or cover the sealing washer, and/or enclose the sealing washer.

Figure 7:
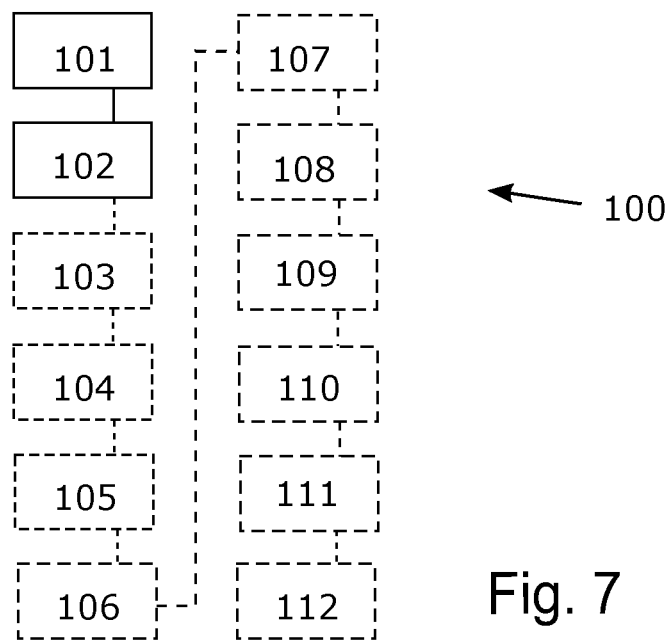
FIG. 7 illustrates a method of retaining a bearing of a rotor shaft in a housing for a centrifugal separator.

FIG. 7 illustrates a method 100 of retaining a bearing of a rotor shaft in a housing for a centrifugal separator, wherein the centrifugal separator is configured to separate a liquid phase from crankcase gases of an internal combustion engine using a rotor, wherein the housing comprises a housing body forming a separation chamber, an opening in the housing body, a bearing retainer arranged at the opening, and a bearing configured to receive a rotor shaft extending through the bearing and the opening into the separation chamber, the rotor shaft being configured to hold the rotor within the separation chamber, wherein the bearing retainer comprises a bearing seat portion for insertion of the bearing, wherein the bearing seat portion is provided with walls configured to enclose the bearing, and wherein the bearing seat portion comprises at least one protrusion arranged at the walls of the bearing seat portion protruding therefrom, wherein the method 100 comprises:
- inserting 101 the bearing into the bearing seat portion of the bearing retainer, and
- performing 102 a plastic deformation of the at least one protrusion towards the bearing so as to form a number of plastically deformed zones to retain the bearing in the bearing retainer.

According to some embodiments, the bearing comprises an outer ring configured to be stationary relative the housing during rotation of the rotor shaft, wherein the method 100 further comprises:
- performing 103 a plastic deformation of the at least one protrusion towards the bearing so as to form a number of plastically deformed zones abutting against the outer ring of the bearing.

According to some embodiments, the bearing retainer is provided with walls enclosing an outer surface the bearing, wherein the bearing seat portion further comprises a stop portion extending into bearing seat portion, wherein the outer ring comprises a first surface abutting the stop portion of the bearing seat portion, and a second surface, being opposite to the first surface, wherein the method 100 further comprises:
- performing 104 a plastic deformation of the at least one protrusion towards the bearing so as to form a number of plastically deformed zones abutting against the second surface of the outer ring of the bearing.

According to some embodiments, the method 100 may further comprise:
- performing 105 a plastic deformation of the at least one protrusion towards the bearing so as to form a number of plastically deformed zones abutting against the second surface in at least three locations.

According to some embodiments, the method 100 may further comprise:
- performing 106 a plastic deformation of the at least one protrusion towards the bearing such that the number of plastically deformed zones enclose the second surface of the bearing.

According to some embodiments, the outer ring of the bearing is provided with a circular edge between the second surface and the outer surface, and wherein the method 100 further comprises:
- performing 107 a plastic deformation of the at least one protrusion towards the bearing such that the number of plastically deformed zones abut against the circular edge.

According to some embodiments, the bearing comprises an inner ring and rotatable bodies arranged between the inner ring and the outer ring, and wherein the method 100 further comprises:
- performing 108 a plastic deformation of the at least one protrusion towards the bearing such that the number of plastically deformed zones cover an area between the inner ring and the outer ring of the bearing.

According to some embodiments, the bearing further comprises a sealing washer covering an area between the inner ring and the outer ring, and wherein the method 100 further comprises:
- performing 109 a plastic deformation of the at least one protrusion towards the bearing such that the number of plastically deformed zones abut against the sealing washer.

According to some embodiments, the method 100 further comprises:
- performing 110 a plastic deformation of the at least one protrusion towards the bearing such that the number of plastically deformed zones enclose the sealing washer.

According to some embodiments, the method 100 further comprises:
- performing 111 the plastic deformation using roll forming.

According to some embodiments, the method 100 further comprises:
- performing 112 the plastic deformation using punch forming.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims.

As used herein, the term "comprising" or "comprises" is open-ended, and includes one or more stated features, elements, steps, components or functions but does not preclude the presence or addition of one or more other features, elements, steps, components, functions or groups thereof.

The invention claimed is:

1. A centrifugal separator, wherein the centrifugal separator is configured to separate a liquid phase from crankcase gases of an internal combustion engine, comprising:
   a housing body forming a separation chamber;
   a rotor having a rotor shaft and a plurality of separation discs within the housing body;

an opening in the housing body;
a bearing retainer arranged at the opening; and
a bearing inserted into the bearing retainer, the bearing having a first end surface, a second end surface and an outer surface,
wherein the bearing is configured to receive the rotor shaft extending through the bearing and the opening into the separation chamber, the rotor shaft being configured to hold the rotor within the separation chamber,
wherein the bearing retainer comprises a bearing seat portion having an axially extending wall and a plurality of plastically deformed zones moved from being extending axially to extending radially inwardly from the axially extending wall and retaining the bearing in the bearing retainer, and
wherein the plurality of plastically deformed zones are a plurality of interspaced and circumferentially arranged protrusions.

2. The centrifugal separator according to claim 1, wherein the bearing comprises an outer ring configured to be stationary relative to the housing during rotation of the rotor shaft, and wherein the plurality of plastically deformed zones abut against the outer ring of the bearing.

3. The centrifugal separator according to claim 2, wherein the axially extending wall of the bearing retainer encloses the outer surface of the bearing,
wherein the bearing seat portion further comprises a stop portion spaced in an axial direction from the plurality of plastically deformed zones,
wherein the first end surface abuts the stop portion of the bearing seat portion, and
wherein the plurality of plastically deformed zones abut against the second end surface of the bearing.

4. The centrifugal separator according to claim 3, wherein the plurality of plastically deformed zones abut against the second end surface in at least three locations.

5. The centrifugal separator according to claim 3, wherein the plurality of plastically deformed zones enclose the second end surface of the bearing.

6. The centrifugal separator according to claim 3, wherein the outer ring of the bearing is provided with a circular edge between the second end surface and the outer surface, and wherein the plurality of plastically deformed zones abut against the circular edge.

7. The centrifugal separator according to claim 2, wherein the bearing further comprises an inner ring and rotatable bodies arranged between the inner ring and the outer ring.

8. The centrifugal separator according to claim 7, wherein the plurality of plastically deformed zones cover an area between the inner ring and the outer ring of the bearing.

9. The centrifugal separator according to claim 7, wherein the bearing further comprises a sealing washer covering an area between the inner ring and the outer ring, and wherein the plurality of plastically deformed zones abut against the sealing washer.

10. The centrifugal separator according to claim 9, wherein the plurality of plastically deformed zones enclose the sealing washer.

11. The centrifugal separator according to claim 1, wherein the plurality of plastically deformed zones are formed by roll forming.

12. The centrifugal separator according to claim 1, wherein the housing body and the bearing retainer are made of a metallic material.

13. The centrifugal separator according to claim 1, wherein the housing body is made of a polymeric material, and
wherein the bearing retainer is made of a metallic material.

14. The centrifugal separator according to claim 1, wherein at least portions of the bearing retainer are embedded in the housing body.

15. The centrifugal separator according to claim 1, further comprising:
a bearing plate provided with a further opening and a further bearing retainer arranged at the further opening, and a further bearing inserted into the further bearing retainer,
wherein the further bearing is configured to receive the rotor shaft extending through the further bearing and the further opening into the separation chamber, and
wherein the further bearing retainer comprises a bearing seat portion provided with a number of plastically deformed zones retaining the further bearing in the further bearing retainer.

16. The centrifugal separator according to claim 1, wherein the housing body and the bearing retainer are made of an aluminium material.

17. The centrifugal separator according to claim 1, wherein the housing body is made of a polymeric material, and
wherein the bearing retainer is made of an aluminium material.

18. The centrifugal separator according to claim 1, wherein the plurality of plastically deformed zones are spaced from one another in a circumferential direction.

19. The centrifugal separator according to claim 1, further comprising a stop portion spaced from the plurality of plastically deformed zones in an axial direction of the bearing retainer,
wherein the bearing is retained between the stop portion and the plurality of plastically deformed zones.

* * * * *